United States Patent [19]

Braun et al.

[11] Patent Number: 4,971,345
[45] Date of Patent: Nov. 20, 1990

[54] SECURITY DEVICE FOR BICYCLE COMPONENTS

[75] Inventors: Robert J. Braun, Kitchener; Eric C. Kurtz, Waterloo, both of Canada

[73] Assignee: 630685 Ontario Inc., Kitchener, Canada

[21] Appl. No.: 242,828

[22] Filed: Sep. 12, 1988

[30] Foreign Application Priority Data

Sep. 14, 1987 [CA] Canada .................................. 546840

[51] Int. Cl.$^5$ .............................................. B62H 5/00
[52] U.S. Cl. ................................ 280/288.4; 24/115 A; 70/233
[58] Field of Search ........... 280/289 R, 289 G, 289 L, 280/288.4; 24/115 A, 265 A, 298; 70/31, 49, 233; 403/394, 290, 377

[56] References Cited

U.S. PATENT DOCUMENTS

| 669,389 | 3/1901 | Gundry | 403/290 X |
| 2,101,681 | 12/1937 | Josephs | 24/115 A X |
| 2,248,971 | 7/1941 | Duffy | 280/289 |
| 3,756,008 | 9/1973 | Smith | 70/233 |
| 3,910,602 | 10/1975 | Lindner | 280/289 L |
| 3,965,709 | 6/1976 | Belke | 70/234 X |
| 3,972,539 | 8/1976 | Mize | 280/289 |
| 3,990,279 | 11/1976 | Brickel | 70/233 |
| 4,023,387 | 5/1977 | Gould | 70/233 |
| 4,490,997 | 1/1985 | Hughes | 70/233 |
| 4,564,230 | 1/1986 | Haist | 24/298 X |

FOREIGN PATENT DOCUMENTS

| 2276210 | 1/1976 | France | 70/233 |
| 36073 | 11/1972 | Japan | 24/115 A |
| 161388 | of 1921 | United Kingdom | 24/115 A |

Primary Examiner—Mitchell J. Hill
Attorney, Agent, or Firm—Anthony Asquith & Co.

[57] ABSTRACT

The device is for preventing the casual theft of a saddle from a bicycle that has a quick-release saddle adjustment, and is particularly useful with mountain bikes. The device comprises a plastic-covered steel cable, with a loop at each end. One loop passes over the rail of the saddle, the other loop passes over the rear stay. The device includes two clips that are suitable for forming the loops in situ on the bicycle. The clips are squeezed down onto the cable with pliers. A preferred clip is 8-shaped.

1 Claim, 1 Drawing Sheet

SECURITY DEVICE FOR BICYCLE COMPONENTS

This invention relates to the prevention of the theft of components from a bicycle, particularly of the bicycle saddle.

BACKGROUND OF THE INVENTION

In the conventional design of bicycle, the saddle post is clamped into a socket on the upper end of the main seat column of the bicycle frame. The saddle is adjustable as regards its height, in that the saddle clamp may be released, allowing the saddle to be raised and lowered in the socket.

As to its construction, the saddle clamp usually comprises a bolt which is mounted tangentially in the seat column, and a complementary nut. The nut may either be a simple hexagonal nut, which can only be turned by the use of a spanner or wrench, or the nut may include a handle, and be hand-manipulable.

When cycling long distances, and especially when touring over different types of terrain, the cyclist wishes to adjust the height of the saddle from time to time. The nut with a handle on is preferred to the hexagonal nut, which needs tools, in this case.

The problem with providing a saddle clamp which can be released without tools is that it is also easy for a thief to release the saddle clamp, and remove the saddle from the bicycle.

The invention provides a security device that renders the saddle easy to adjust but at the same time difficult to steal.

The security device of the invention also is inexpensive to construct; is not bulky, for ease of packaging and display; is easy to apply to the bicycle using only basic skills and tools; and provides an adequate deterrent against the casual thief.

It should be noted that a bicycle is not in any event a secure article. A determined thief, equipped with a reasonably comprehensive tool kit, is easily able to make off with most of the components of the bicycle, even if, for example, the frame of the bicycle is secured by a padlocked chain to a fixture. And a thief equipped with a chain cutter is not stopped by a padlocked chain.

It is recognized in the invention that it is effective to take security precautions against the casual thief, who is not equipped with tools, but that further security, aimed at the well-equipped, determined thief, is generally too expensive to be worthwhile.

However, in the case of the cycle touring enthusiast, not only is the trend now to replace the hexagonal saddle clamp-nut with a hand-manipulable nut, but the cyclist increasingly requires better protection against thieves.

A touring bicycle can be quite sophisticated, and some of the components, such as the saddle, can be expensive items, and therefore attractive to a thief.

It is recognized that a security device for a saddle therefore should be such as to repel a thief equipped with a spanner or wrench, as well as the thief equipped with no tools at all, but that it is hardly worth making the device proof against a thief equipped with a chain cutter or a saw.

A security device for a saddle should not interfere with the adjustment of the saddle, should be neat and unobtrusive in appearance, and should be inexpensive to manufacture, and should be easy and safe to install.

GENERAL DESCRIPTION OF THE INVENTION

The invention provides a security cable, which is provided with a loop at each end, which is long enough to allow the saddle to be adjusted over its full range of movement. The cable comprises a core of steel strands encased in a plastic sheath.

The cable is provided with two clips, and in the invention, prior to the device being installed on the bicycle, the clips are loose on the cable. One end of the cable is looped through a suitable place on the saddle and the other end of the cable is looped through a suitable place on the frame of the bicycle. The loops are formed and secured in situ, in that the clips are adapted to be squeezed tightly onto the cable, upon installation of the device.

The frame of a bicycle has, over the years, become quite standardized. The two smaller tubes or stays that carry the rear wheel extend from the seat column, just under the saddle, the two smaller tubes being welded one on each side of the seat column. With this construction, a very convenient attachment point is provided for the security device of the invention, in that the lower end of the cable is simply looped around the rear wheel stay.

Preferably the clip is shaped like a numeral-8, with two apertures to receive both the cable, and the looped end of the cable. The clip should be made of soft metal, so as to be easily crushed into the plastic sheath of the cable, upon being squeezed with pliers.

DETAILED DESCRIPTION OF PREFERRED EMBODIMENT

A practical example of security device which incorporates the invention will now be described, with reference to the accompanying drawings in which.

Figure 1:
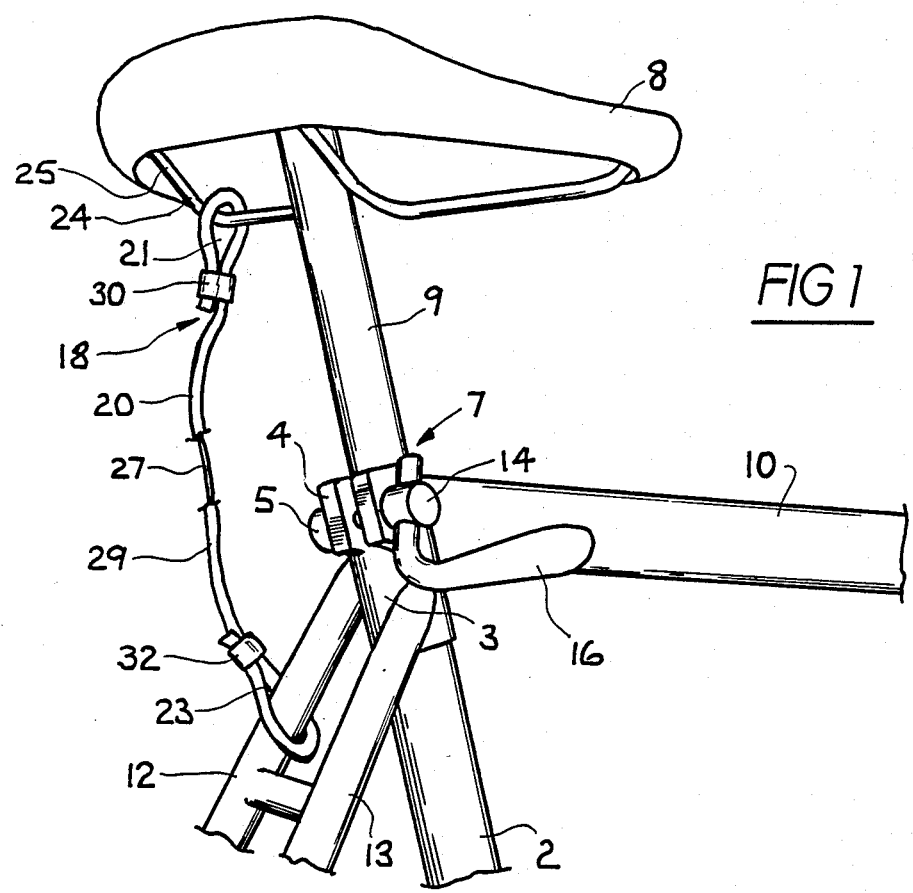
FIG. 1 is a view of an example of a security device, which is incorporated into a bicycle in the manner of the invention.

the bicycle which is shown, in part, in FIG. 1 is of the established conventional construction. The upper end of the main structural seat column 2 is provided with a collar 3. The collar 3 is split longitudinally, and is provided with lugs 4 and a clamp bolt 5, which is disposed in holes in the lugs 4, all forming a clamp assembly 7.

The saddle 8 of the bicycle is mounted on a saddle post 9. The saddle post 9 is dimensioned so as to be gripped tightly in the collar 3 when the clamp assembly 7 is tight.

The crossbar 10 of the bicycle is unitary with the collar 3.

The two rear wheel stays 12, 13 of the bicycle also are unitary with the collar 3. These stays 1213, are made of tubing that has a smaller diameter than the tubing of the seat column 2 or the crossbar 10.

The clamp bolt 5 is provided at one end with a cam tightening mechanism 14, which is operated by a handle 16. The arrangement is such that a swing of the handle 16 of approximately 90 degrees is sufficient to lock and unlock the clamp. The other end of the bolt 5 is provided with an adjusting nut, so that the swing of the handle may be set to take place over a convenient range.

The easy-to-operate cam tightening mechanism 14 and the handle 16 make it easy for the cyclist to adjust and re-adjust the height of the saddle to suit different riding conditions; but, as pointed out above, the handle 16 unfortunately also makes it easy for even the casual thief to remove the saddle. It is not that the saddle is a particularly valuable item -- but the loss of a saddle is highly inconvenient because very few riders carry a spare and the bicycle is unridable without a saddle. One of the attractions of bicycle touring is that it enables people to get away from population centres, including shops where a replacement saddle might be obtained.

The class of bicycle known as mountain bikes, or all-terrain bikes, have a particular need for an easy-to-adjust saddle, and such bicycles also are sophisticated and are predominantly used away from population centres. The security device of the invention is therefore especially suitable for use on mountain bikes.

The security device 18 comprises a length of flexible cable 20, on the ends of which respective loops 21, 23 are formed. The loop 23 on the lower end of the cable 20 is secured around one of the rear wheel stays 12. The loop 21 on the upper end of the cable 20 is secured through one of the spring rails 25 of the saddle 8.

Figure 2:
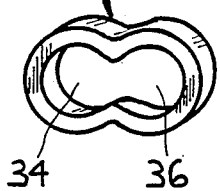
FIG. 2 is a view of a clip that is a component of the security device illustrated in FIG. 1.

The cable 20, as shown, is of the kind that consists of a central core 27 of steel strands, and an outer sheath 29 of plastic. The loops 21, 23 are held in place by means of respective clips 30, 32. The clips 30, 32 are shown separately in FIG. 2, and consist each of a short length of a soft metal, such as aluminum, having the cross-section as illustrated. The general cross-sectional shape of the clip is that of a numeral "8". The dimensions of the clip 30, 32 are such that one of the apertures 34, 36 of the clip slides freely over the plastic sheath 29.

When assembling the device 18 to the bicycle, the loops 21, 23 are formed in situ. First, the clip 30, in its free state, is placed loosely over a free end of the cable. The cable in its free state is about 50 cm long, and the clip is positioned about 15 cm from the end of the cable. The free end of the cable is passed over the spring rail 25, and then is passed through the other aperture 36 of the clip 30.

Once the loop is correctly dimensioned and positioned over the rail 25, the clip 30 is squeezed shut using a pair of pliers.

The process is then repeated at the lower end of the cable 20, the loop 23 of which is formed around the rear wheel stay 12. The clip 32 again is squeezed tight using pliers.

The slack of the cable, if any, may be taken up by winding the cable 20 around the saddle post 9. Enough slack should be left in the cable, however, to permit the full range of adjustment of the height of the saddle, and, if desired, to permit the saddle post 9 to be withdrawn from the collar 3. Once the device 18 is assembled, however, it is intended that the saddle 8 remains fixed to the bicycle for the life of the bicycle.

Some types of bicycle have the stays 1213, attached, not to the collar 3, but to the seat column some distance down from the collar. The cable may be made about 61 cm long, for use on such bicycles.

With the type of clip 30, 32 as shown, once the clip is squeezed tight, it is not practically possible to open the clip by, for example, prying the clip open with such a tool as a screwdriver. It may be noted that the plastic sheath 29 of the cable is important to the degree of resistance of the device to the manipulations of a thief. Even if the clip were to be opened slightly, as with a screwdriver, it would still not be simple for a thief to slide the looped end of the cable out of the clip. In order for the loop in the cable to be pulled apart, the clip would have to be opened out until its aperture 36 was restored substantially to its former size and shape, which is virtually impossible to do. In practice, the only way to release the clip to a sufficient extent to allow the loop to be opened, is to saw the clip through with a hacksaw. It is not practical to protect the bicycle against the thief who is equipped with a hacksaw.

When the clip is squeezed tight onto the cable, the clip easily compresses the soft plastic. If the plastic were not present, the clip would be far less secure. The means that stops the clip moving along the cable is not particularly the friction of the clip's grip on the steel, but the fact that in order for the clip to move along the cable, the plastic would have to distort to pass under the clip.

During manipulation of the loop under the saddle, it is preferred that the loop be self-holding, ie that the loop does not spring apart if the clip and cable are let go by the fingers. If the loop is self-holding, a person finds it easy to adjust the loop, and the job of holding the cable, and then applying the pliers, and squeezing the clip, can easily be done by just one pair of hands. With the clip of FIG. 2, when the two portions of the cable lie side by side in the as-yet unsqueezed apertures of the clip, it is found that the loop is self-holding in this manner.

Figure 3:
FIG. 3 is a view of an alternative clip.

Other designs of clip are contemplated in the invention, and a further example is shown in FIG. 3. Here, the clip 40 may be assembled laterally onto the cable (a feature which may be contrasted with the clip of FIG. 2, where the cable must be passed lengthwise through the clip. One advantage of the clip of FIG. 3 is that the clip can be squeezed independently onto the two portions of the cable. Thus, during manufacture of the security device, the clip can be squeezed onto the cable at a point about 15 cm from the end of the cable, which simplifies the formation and manipulation of the loop during installation. It would be more difficult with the clip of FIG. 2 to pre-install the clip on the cable, because in the clip of FIG. 2 it is more difficult to squeeze the two apertures 34, 36 independently of each other. The clip of FIG. 3, however, is not so resistant as the clip of FIG. 2 to being pried open with such a tool as a screwdriver.

The security device of the invention is inexpensive to produce, is easy to assemble and install, is neat and unobtrusive in appearance, and is reliable and efficient in preventing casual theft.

We claim:

1. Combination of a bicycle and a security device, the security device being suitable for use to retain a bicycle saddle to the frame of the bicycle;

the combination includes:

a manually operable, quick-release saddle adjustment means, the adjustment means being of the kind in which the saddle may be adjusted relative to the frame by a person, without the use of tools;

a length of flexible cable, comprising a core of steel strans, encased in a plastic sheath;

two clips, each clip being adapted for fastening two portions o f the cable together in a permanently secure manner;

a saddle having a spring rail;

a saddle column, and a rear wheel stay which is fixed to the saddle column;

wherein:

the cable is configured into two loops, in that, in respect of each loop, two portions of the cable lie in a side-by-side overlapping relationship, and are fastened together by one of the clips;

each clip is of the kind that can be crimped by a crimping operation comprising crushing or squeezing to a substantially smaller size and shape, by the use of hand force upon a hand-held tool;

each clip and the plastic-sheathed cable are of the kind which, upon the clip being crimped by the use of the aforesaid hand force on to the cable, the clip compresses, and digs into, the plastic sheath;

the cable is loose enough on the bicycle frame to permit the height of the saddle relative to the frame to be adjusted;

the two loops are arranged one at each end of the cable;

one of the loops is secured over and through the spring rail;

and the other loop is secured around and between the rear wheel stay and the column.

* * * * *